Nov. 8, 1955  W. BLOCKINGER, SR., ET AL  2,722,769
FISHING BOBBER
Filed July 14, 1953
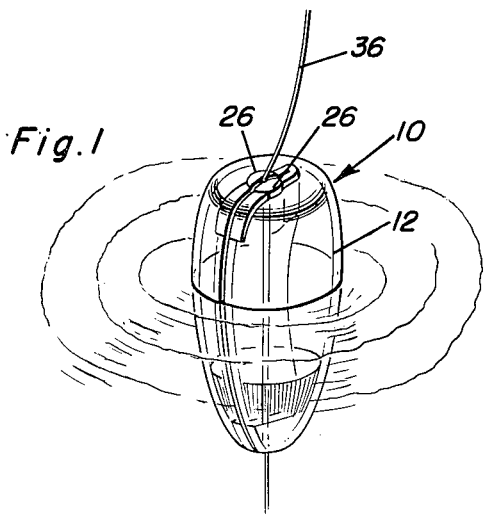
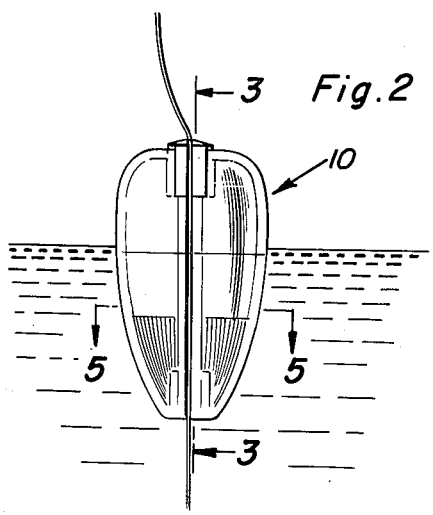
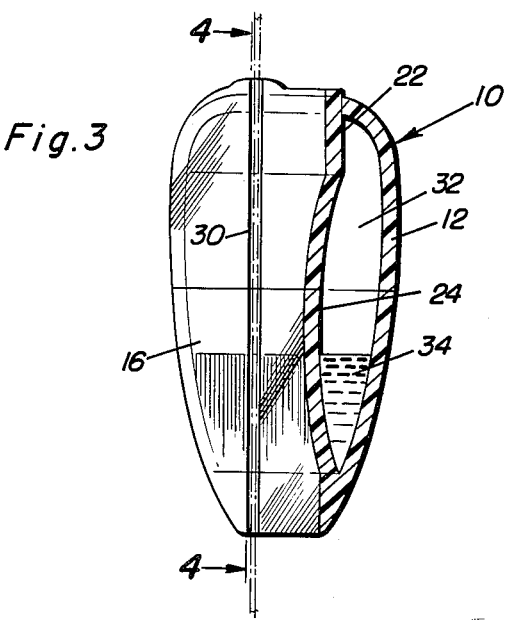
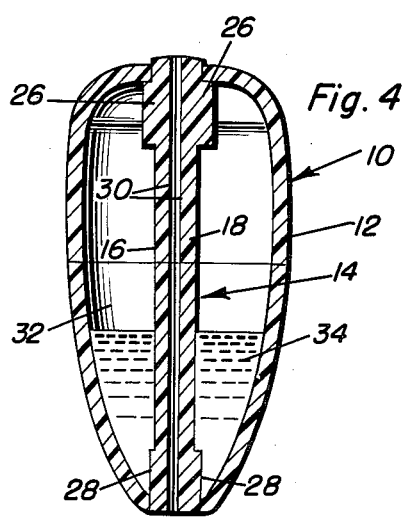
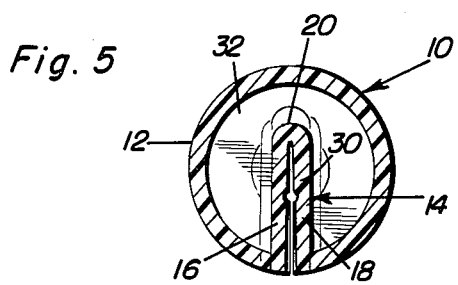
William Blockinger, Sr.
John J. Blockinger
INVENTORS.
BY *Clarence A. O'Brien*
and *Harvey B. Jacobson*
Attorneys

United States Patent Office 2,722,769
Patented Nov. 8, 1955

2,722,769

FISHING BOBBER

William Blockinger, Sr. and John J. Blockinger, West St. Paul, Minn.

Application July 14, 1953, Serial No. 367,818

3 Claims. (Cl. 43—44.91)

This invention relates generally to fishermen's accessories and pertains more particularly to an improved form of bobber.

A primary object of this invention is to provide an improved form of fishing bobber of economical and rugged construction which incorporates a minimum number of component parts and which is of simple yet effective design.

Another object of this invention is to provide an improved form of fishing bobber which incorporates a unitary or integral structure embodying a hollow body including inwardly directed, closely spaced wall portions which are resiliently urged together to frictionally engage a fishing line therebetween for connection to the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the bobber in use;

Figure 2 is a vertical elevation of the assembly shown in Figure 1;

Figure 3 is a vertical section taken substantially along the plane of section line 3—3 of Figure 2;

Figure 4 is another vertical section taken substantially along the plane of section line 4—4 of Figure 3 showing the relationship of the line gripping portions of the bobber; and Figure 5 is a horizontal section taken substantially along the plane of section line 5—5 in Figure 2 showing further details of the line gripping assembly.

Referring now more particularly to the drawings, reference numeral 10 indicates generally the hollow body member which comprises the bobber and which includes an outer wall member 12 and an inner wall member 14. The outer wall is substantially continuous throughout its extent with the exception of the longitudinally extending slot formed therein where the free edges of this wall are affixed to the marginal edges of the inner wall member 14. As will be seen, the inner wall 14 includes the two halves 16 and 18 which are joined inwardly of the body along the bight 20 so that the two halves are disposed in closely spaced relation. As seen most clearly in Figure 3 the edge formed by the fold 20 includes an upper straight portion 22, an intermediate arcuate portion 24 and a lower portion which merges smoothly with the outer wall 12. As seen most clearly in Figure 4, each inner wall half is formed at its opposite ends with the upper enlarged boss portion 26 and the lower enlarged boss portion 28 respectively and it will be seen that each inner wall half is provided with a groove 30 extending between its upper and lower boss portions, the purpose of which will be presently apparent.

The bobber thus formed presents a chamber or interior 32 of generally C-shaped cross section which will render the bobber buoyant. To provide sufficient weight to the bobber for casting and maintaining the same in the upright position shown in Figures 1 and 2, it may be desirable to partially fill the interior of the bobber with a suitable liquid 34.

In use, it will be appreciated by reference to Figure 5 that the longitudinal edges of the inner wall halves 16 and 18 are spread apart sufficiently at their outer ends to permit a fishing line 36 to be forced therebetween. This, of course, effects a spreading action between the inner wall halves and the fishing line which is forced inwardly of the bobber until it is gripped within the grooves 30 thereof. It will be noted that the gripping action is effected by the resiliency of the fishing bobber and is enhanced by reason of the fact that the fold 20 is not continuous or straight throughout its length but is provided with the intermediate arcuate portion 24 which will resist bending even if the bobber is formed of rather pliable material.

It will be appreciated that the fishing line is effectively gripped by the bobber and the associated hook may be rapidly and easily set for fishing at any desired depth merely by sliding the bobber along the fishing line until the desired depth of the hook is obtained. At the same time, the fishing line is gripped sufficiently to prevent its accidental removal.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fishing bobber comprising a hollow body including an inner and an outer wall member providing a sealed chamber therebetween, the outer wall member being substantially continuous except for longitudinal edge portions spaced transversely, and the inner wall member comprising two half portions joined inwardly of the body along corresponding longitudinal edge portions by a fold wherein the half portions are disposed in closely spaced relation and said half portions having longitudinal edges thereof opposite said fold joined to the corresponding edge portions of the outer wall member, the fold line of said inner wall member being longitudinally arcuate to resist spreading of said half portions.

2. The combination of claim 1 and wherein said body is partially filled with liquid.

3. The combination of claim 1 and wherein the half portions of said inner wall member are longitudinally grooved to receive an associated fishing line.

References Cited in the file of this patent

UNITED STATES PATENTS

| 12,060 | Hoard | Dec. 12, 1854 |
| 763,557 | Hachmann | June 28, 1904 |
| 2,623,322 | Brown | Dec. 30, 1952 |

FOREIGN PATENTS

| 614,801 | Great Britain | Dec. 22, 1948 |